US011289725B2

(12) United States Patent
Blanchet

(10) Patent No.: US 11,289,725 B2
(45) Date of Patent: Mar. 29, 2022

(54) FUEL CELL MODULE ARRANGEMENT WITH LEAK RECOVERY AND METHODS OF USE

(71) Applicant: Nuvera Fuel Cells, LLC, Billerica, MA (US)

(72) Inventor: Scott Blanchet, Chelmsford, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 320 days.

(21) Appl. No.: 16/173,142

(22) Filed: Oct. 29, 2018

(65) Prior Publication Data

US 2019/0140293 A1 May 9, 2019

Related U.S. Application Data

(60) Provisional application No. 62/581,216, filed on Nov. 3, 2017.

(51) Int. Cl.
| | |
|---|---|
| *H01M 8/04746* | (2016.01) |
| *H01M 8/04664* | (2016.01) |
| *H01M 8/2475* | (2016.01) |
| *H01M 8/0438* | (2016.01) |
| *H01M 8/04537* | (2016.01) |
| *H01M 8/04089* | (2016.01) |

(Continued)

(52) U.S. Cl.
CPC ... *H01M 8/04746* (2013.01); *H01M 8/04089* (2013.01); *H01M 8/04395* (2013.01); *H01M 8/04544* (2013.01); *H01M 8/04552* (2013.01); *H01M 8/04664* (2013.01); *H01M 8/04671* (2013.01); *H01M 8/04753* (2013.01); *H01M 8/04955* (2013.01); *H01M 8/2475* (2013.01); *H01M 2008/1095* (2013.01)

(58) Field of Classification Search
CPC ......... H01M 8/04746; H01M 8/04089; H01M 8/04544; H01M 8/04664; H01M 8/04955
See application file for complete search history.

(56) References Cited

U.S. PATENT DOCUMENTS

| | | |
|---|---|---|
| 6,884,532 B2 | 4/2005 | Monzel |
| 7,348,085 B2 | 3/2008 | Bette et al. |

(Continued)

FOREIGN PATENT DOCUMENTS

WO    WO 2005/099017 A2    10/2005

OTHER PUBLICATIONS

International Search Report and Written Opinion of the International Searching Authority for International Application No. PCT/US2018/057918 dated Jan. 2, 2019, 16 pages.

*Primary Examiner* — Sarah A. Slifka
(74) *Attorney, Agent, or Firm* — Finnegan, Henderson, Farabow, Garrett & Dunner LLP

(57) ABSTRACT

The present disclosure is directed to a fuel cell module. The fuel cell module may include a fuel cell having an anode, a cathode, and an electrolyte positioned between the anode and the cathode. The fuel cell module may also include an enclosure housing the fuel cell therein. The enclosure may include an air inlet and an air outlet. The fuel cell module may further include an air pressurizing mechanism fluidly connected to the enclosure. The air pressurizing mechanism may be configured to draw air through the air inlet into the enclosure and from the enclosure to the air pressurizing mechanism through the air outlet. The air pressurizing mechanism may be configured to pressurize the air to form a pressurized air stream that is directed to the cathode.

21 Claims, 3 Drawing Sheets

(51) Int. Cl.
*H01M 8/04955* (2016.01)
*H01M 8/1018* (2016.01)
*H01M 8/10* (2016.01)

(56) References Cited

U.S. PATENT DOCUMENTS

| | | |
|---|---|---|
| 9,444,110 B2 | 9/2016 | Preston et al. |
| 9,685,673 B2 | 6/2017 | Ballantine et al. |
| 2008/0145722 A1 | 6/2008 | Coignet et al. |
| 2008/0156549 A1 | 7/2008 | Leboe et al. |
| 2014/0220466 A1 | 8/2014 | Foster et al. |

FUEL CELL MODULE ARRANGEMENT WITH LEAK RECOVERY AND METHODS OF USE

This application claims the benefit of U.S. Provisional Application No. 62/581,216, filed Nov. 3, 2017, which is incorporated by reference in its entirety.

The present disclosure is directed towards electrochemical cell modules, and more specifically, electrochemical cell modules with leak recovery.

Fuel cells, usually classified as electrochemical cells or electrolysis cells, are devices used for generating current from chemical reactions or for inducing a chemical reaction using a flow of current. A fuel cell converts the chemical energy of a fuel (e.g., hydrogen, natural gas, methanol, gasoline, etc.) and an oxidant (air or oxygen) into electricity and waste products of heat and water. A basic fuel cell includes a negatively charged anode, a positively charged cathode, and an ion-conducting material called an electrolyte.

Different fuel cell technologies utilize different electrolyte materials. A Proton Exchange Membrane (PEM) fuel cell, for example, utilizes a polymeric ion-conducting membrane as the electrolyte. In a hydrogen PEM fuel cell, hydrogen atoms can electrochemically split into electrons and protons (hydrogen ions) at the anode. The electrons flow through a circuit to the cathode and generate electricity, while the protons diffuse through the electrolyte membrane to the cathode. At the cathode, protons can react with electrons and oxygen that are supplied to the cathode to produce water and heat.

The reactions taking place at the anode and the cathode of a hydrogen PEM fuel cell can be expressed as chemical equations, as shown below.

Anode oxidation reaction: $2H_2 \rightarrow 4H^+ + 4e^-$

Cathode reduction reaction: $4H^+ + 4e^- + O_2 \rightarrow 2H_2O$

Overall electrochemical reaction: $2H_2 + O_2 \rightarrow 2H_2O$

A common safety concern for fuel cells or fuel cell systems is hydrogen leakage. For example, hydrogen may leak from the anode or through the electrolyte (e.g., the polymeric ion-conducting membrane) without being reacted. Hydrogen leaks may result in poor electrical performance of individual fuel cells. Also, hydrogen is a combustible gas and poses a potential fire hazard when the hydrogen is leaked and mixed with air.

To reduce the risks of fire or explosion, a number of methods or technologies have been proposed to detect hydrogen leaks in fuel cell. For example, various types of hydrogen sensors or hydrogen detectors have been used at selected places close to the fuel cells to detect hydrogen leaks. However, because of the properties of hydrogen, hydrogen leaks are difficult to detect by these sensors. For example, hydrogen is odorless and colorless, has the lowest molecular weight (lighter than air), and diffuses rapidly. Thus, the hydrogen sensors have difficulty detecting leaks and can be expensive. In addition, because the hydrogen sensors do not inform about the location of the leaks, it can be labor and time consuming to locate the leaks. Some methods include enclosing the fuel cells with an explosion-proof container while detecting the accumulation of hydrogen in the container at the same time. The detection of hydrogen leaks requires further inspection and suspension of operation of the fuel cell system until the leaks are located and repaired. Other methods include adding ventilation systems to the fuel cell system, and/or using explosion-proof, non-arching, or non-sparking system components, such as motors, valves, and other instruments. However, these technologies and methods add expense and complexity to the fuel cell system.

Therefore, there is a need for an improved fuel cell arrangement and method for reducing hydrogen leaks and risks of fire or explosion.

In consideration of the aforementioned circumstances, the present disclosure is directed toward a fuel cell module or a fuel cell system with leak recovery, which may prevent or at least reduce the risk of hydrogen leaks to the surrounding environment.

In one aspect, the present disclosure is directed to a fuel cell module. The fuel cell module may include a fuel cell having an anode, a cathode, and an electrolyte positioned between the anode and the cathode. The fuel cell module may also include an enclosure housing the fuel cell therein. The enclosure may include an air inlet and an air outlet. The fuel cell module may further include an air pressurizing mechanism fluidly connected to the enclosure. The air pressurizing mechanism may be configured to draw air through the air inlet into the enclosure and from the enclosure to the air pressurizing mechanism through the air outlet. The air pressurizing mechanism may be configured to pressurize the air to form a pressurized air stream that is directed to the cathode. Any gas leaked from the fuel cell may be configured to be leaked into the enclosure where it is drawn by the air pressurizing mechanism from the enclosure and supplied to the cathode. In some embodiments, hydrogen leaked from the fuel cell can be leaked into the enclosure where it is drawn by the air pressurizing mechanism from the enclosure and supplied to the cathode where it is processed into water. The enclosure may further include an exhaust outlet where oxygen depleted air is discharged from the cathode. The enclosure may be configured to be air-tight sealed except for the air inlet and the air outlet. The air pressurizing mechanism may be at least one of an air blower and an air compressor. The fuel cell may be configured to be insulated from the enclosure. The air inlet may be located at a top section or at a bottom section of the enclosure and may be located closer to the anode than the cathode. In some embodiments, fuel cell module may also include a voltage detector and a controller. The voltage detector may be configured to detect a voltage of the fuel cell. The controller may be configured to stop the operation of the fuel cell when the voltage of the fuel cell drops below a predetermined threshold. The fuel cell module may further include an air flow sensor configured to measure a flow rate of the air through the air inlet.

In another aspect, the present disclosure is directed to a method of reducing hydrogen leaks in a fuel cell system. The method may include housing a fuel cell in an enclosure. The fuel cell may include an anode, a cathode, and an electrolyte positioned between the anode and the cathode. The enclosure may include an air inlet and an air outlet. The enclosure may be air-tight sealed except for the air inlet and the air outlet. The air inlet may be located at a top section or at a bottom section of the enclosure and may be located closer to the anode than the cathode. The fuel cell may be configured to be insulated from the enclosure. The method may also include drawing air through the air inlet into the enclosure and from the enclosure to an air pressurizing mechanism through the air outlet. The method may further include pressurizing the air via the air pressurizing mechanism to form a pressurized air stream. The method may include directing the pressurized air stream to the cathode. The method may further include drawing any gas leaked from the fuel cell into the enclosure and directing it from the enclosure to the cathode through the air pressurizing mechanism. Hydrogen leaked from the fuel cell can be leaked into the enclosure where it is drawn by the air pressurizing mechanism from the enclosure and supplied to the cathode where it is processed into water. The method may also include discharging oxygen depleted air from the cathode through an exhaust outlet. The method may also include detecting, using a voltage detector, a voltage of the fuel cell. The method may include stopping the operation of the fuel cell stack, using a controller, when the voltage of the fuel cell drops below a predetermined threshold. The method may further include measuring, using an air flow sensor, a flow rate of the air through the air inlet.

In another aspect, the present disclosure is directed to a fuel cell system. The fuel cell system may include a fuel cell stack. The fuel cell stack may include a plurality of fuel cells. The fuel cells may each include an anode, a cathode, and an electrolyte positioned between the anode and the cathode. The fuel cell system may also include an enclosure housing the fuel cell stack therein. The enclosure may include an air inlet and an air outlet. The fuel cell system may further include an air pressurizing mechanism fluidly connected to the enclosure. The air pressurizing mechanism may be configured to draw air through the air inlet into the enclosure and from the enclosure to the air pressurizing mechanism through the air outlet. The air pressurizing mechanism may be configured to pressurize the air to form a pressurized air stream that is directed to the cathodes of the plurality of fuel cells.

It is to be understood that both the foregoing general description and the following detailed description are exemplary and explanatory only and are not restrictive of the present disclosure as claimed.

The accompanying drawings, which are incorporated in and constitute a part of this specification, illustrate embodiments of the present disclosure and together with the description, serve to explain the principles of the disclosure.

Reference will now be made in detail to the exemplary embodiments of the present disclosure, examples of which are illustrated in the accompanying drawings. Wherever possible, the same reference numbers will be used throughout the drawings to refer to the same or like parts.

The present disclosure is described herein with reference to illustrative embodiments. It is understood that the embodiments described herein are not limited thereto. Those having ordinary skill in the art and access to the teachings provided herein will recognize additional modifications, applications, embodiments, and substitution of equivalents that all fall with the scope of the present disclosure.

Hydrogen leaks are a common concern for fuel cell systems because they create a safety hazard. Hydrogen may leak from the anode or through the electrolyte (e.g., the polymeric ion-conducting membrane) without being reacted. For example, it is possible for holes to develop in the polymeric ion-conducting membrane over its lifetime, allowing hydrogen to pass from the anode to the cathode and to leak out of the fuel cell. It is also possible for hydrogen to leak from a broken gas seal at the anode or from a fuel cell stack when the compression of the stack becomes loose. The hydrogen may leak to the cathode, into the coolant of the fuel cell system, or external to the fuel cell stack or the fuel cell system. Hydrogen is flammable when mixed with air over a wide range of concentrations and can be easily ignited by a spark or hot surface. Embodiments of the present disclosure provide apparatuses, systems, and methods of leak recovery that reduce the risk of hydrogen leaking from a fuel cell or fuel cell stack to the ambient environment, thereby reducing the risk of potential fire or explosion from the fuel cell system.

Figure 1:
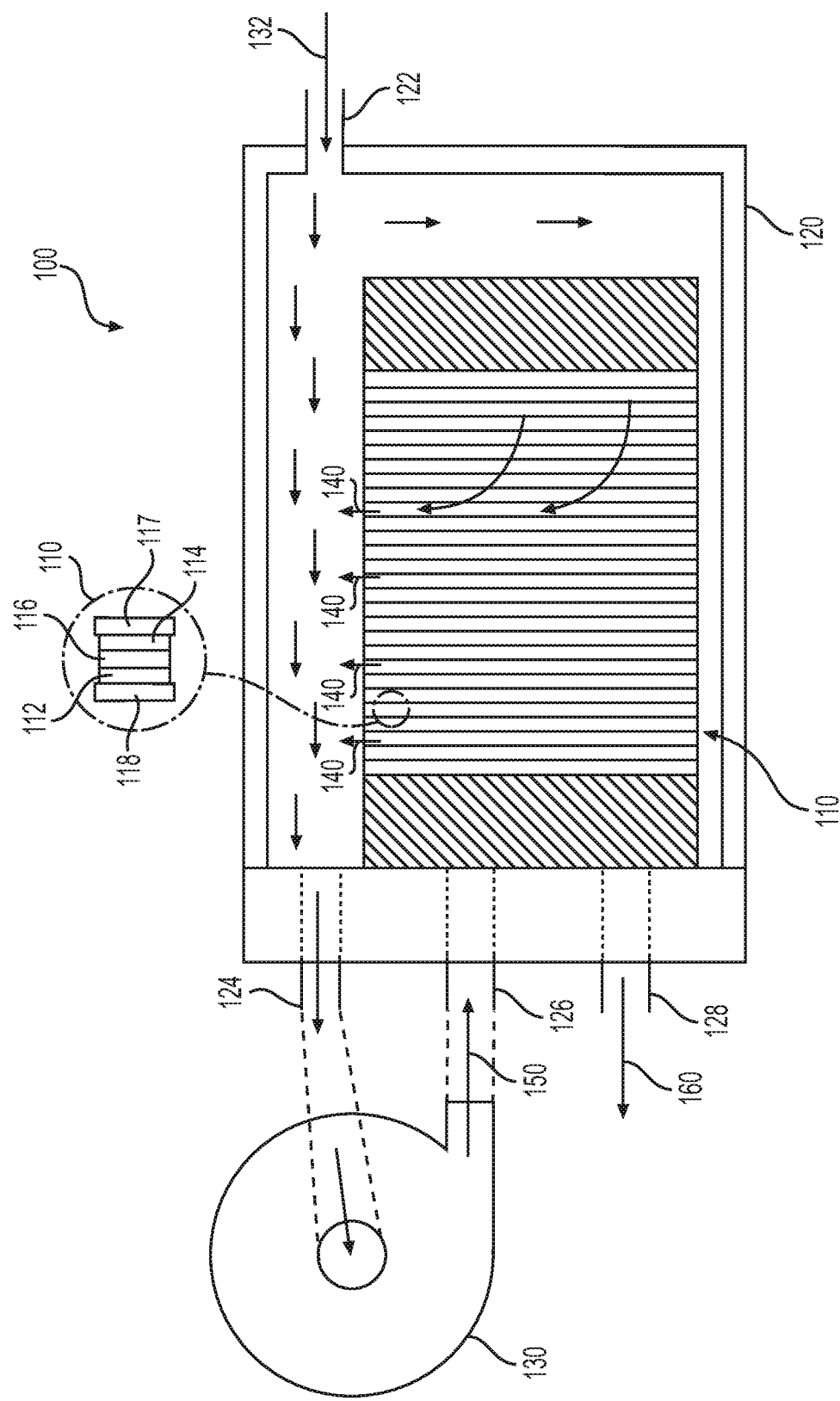
FIG. 1 is a schematic diagram of an exemplary fuel cell module, according embodiments of the present disclosure.

FIG. 1 is a schematic diagram of an exemplary fuel cell module 100, according embodiments of the present disclosure. Fuel cell module 100 may convert the chemical energy of a fuel (e.g., hydrogen, natural gas, methanol, gasoline, etc.) and an oxidant (e.g., air or oxygen) into electricity and produce heat and water. Fuel cell module 100 may include at least one fuel cell 110 or a plurality of fuel cells 110 stacked together between end plates to form a fuel cell stack. Fuel cell 110 may include a cathode 112, an anode 114, and an electrolyte 116 disposed between cathode 112 and anode 114. Fuel cell 110 may also include bipolar plates 117 and 118 adjacent each of the electrodes (anode and cathode). The bipolar plates may act as support plates, conductors, and may be configured to provide the gas inlets to the respective electrodes of fuel cell 110 and passages or outlets for discharging used fuel and exhaust gases. In some embodiments, fuel cell 110 may include additional elements, including for example flow structures and gas diffusion layers positioned between the electrodes and the bipolar plates. Anode 114 of fuel cell 110 may be supplied with a fuel stream (e.g., hydrogen) and a used fuel stream (not shown) may be discharged from anode 114. Although not shown in FIG. 1, fuel cell module 100 may recirculate the used fuel stream in order to recycle unconsumed fuel.

Electrolyte 116 may be an ion-conducting material, such as a proton exchange membrane (PEM). PEM may include a pure polymer membrane or composite membrane where other material, for example, silica, heteropolyacids, layered metal phosphates, phosphates, and zirconium phosphates may be embedded in a polymer matrix. PEM may be permeable to protons while not conducting electrons. Anode 114 and cathode 112 may be porous carbon electrodes containing a catalyst layer. The catalyst material, for example platinum, may increase the electrochemical reaction taking place at anode 114 and/or cathode 112.

For the purposes of this description, it will be assumed that fuel cell 110 is a PEM fuel cell. However, as described herein, this disclosure is not limited to PEM fuel cells. As is known in the art, for a PEM fuel cell, for example, hydrogen atoms may be electrochemically split into electrons and protons (hydrogen ions) at anode 114. The electrons produced by the electrochemical reaction flow through an electric load circuit (not shown in FIG. 1) to cathode 112, producing direct-current electricity. The protons produced by the electrochemical reaction at anode 114 diffuse through electrolyte or proton exchange membrane 116 to cathode 112. Electrolyte or proton exchange membrane 116 may prevent the passage of negatively charged electrons while allowing the passage of positively charged ions, for example, protons. Following passage through electrolyte or proton exchange membrane 116, the protons at cathode 112 may react with electrons that have passed through the electric load circuit and the oxygen supplied to cathode 112 to produce heat and water.

As shown in FIG. 1, fuel cell module 100 further includes an enclosure 120 housing fuel cell 110 therein and air pressurizing mechanism 130 fluidly connected to enclosure 120. Enclosure 120 may include an air inlet 122 and an air outlet 124. An oxidant gas, for example air 132, may be supplied to fuel cell 110 via air inlet 122 and air outlet 124. In some embodiments, air 132 may be air drawn from the surrounding ambient environment. Enclosure 120 is air-tight sealed except for air inlet 122 and air outlet 124. In some embodiments, fuel cell 110 is insulated from enclosure 120 to reduce heat transfer from fuel cell 110 or a fuel cell stack to air 132 flowing through enclosure 120. For example, fuel cell 110 or a fuel cell stack of fuel cell module 100 may be surrounded by materials with low thermal conductivity, such as plastic, porous ceramic, or fibrous materials.

Air pressurizing mechanism 130 may be any suitable air pressuring mechanism, for example, an air blower or an air compressor. An inlet of air pressurizing mechanism 130 may be fluidly connected to air outlet 124 and an outlet of air pressurizing mechanism 130 may be fluidly connected to a pressurized air inlet 126 of cathode 112. For example, as shown in FIG. 1, air pressurizing mechanism 130 may be configured to draw air 132 through air inlet 122 into enclosure 120 and from enclosure 120 to air pressurizing mechanism 130 through air outlet 124. Air pressurizing mechanism 130 may pressurize air 132 to form a pressurized air stream 150 and direct pressurized air stream 150 to cathode 112 via pressurized air inlet 126.

At least a portion of pressurized air stream 150 supplied to cathode 112 may be consumed by the electrochemical reaction taking place at cathode 112, producing an oxygen depleted air flow 160 containing water. Oxygen depleted air flow 160 may be discharged from cathode 112 via an exhaust outlet 128. Pressurized air inlet 126 and exhaust outlet 128 may have any suitable width, cross-sectional area, depth, shape, and/or configuration. While fuel cell 110 has one air inlet and one exhaust outlet as depicted in FIG. 1, it will be understood that a greater number of inlets or outlets may be provided.

As described herein, although not depicted in FIG. 1, anode 114 of fuel cell 110 may be supplied with a fuel stream, such as hydrogen, via a fuel inlet and discharge a used fuel stream from anode 114 via a fuel outlet. In some instances, hydrogen supplied to anode 114 may leak from anode 114 or through electrolyte or proton exchange membrane 116 without being reacted. As shown in FIG. 1, in fuel cell module 100, hydrogen leaked from fuel cell 110 (hereafter "hydrogen leaks 140") may be leaked into enclosure 120 from anode 114 and/or electrolyte 116. After entering enclosure 120, hydrogen leaks 140 may be mixed with air 132 and together may be drawn by air pressurizing mechanism 130 from enclosure 120 via the draft generated to air pressurizing mechanism 130 through air outlet 124. The draft generated within enclosure 120 by air pressurizing mechanism 130 may prevent hydrogen leaks from leaving enclosure 120 through air inlet 122. Pressurizing mechanism 130 may combine and pressurize hydrogen leaks 140 and air 132 to form pressurized air stream 150 that may be directed to cathode 112. Hydrogen leaks 140 supplied to cathode 112 may then be reacted into water at cathode 112. For example, hydrogen leaks 140 may react with oxygen in air 132 at the cathode and produce heat and water (e.g., $2H_2 + O_2 \rightarrow 2H_2O$). Therefore, any potential hydrogen leaks 140 from fuel cell 110 may be prevented from escaping from enclosure 120 to the outside environment where it may create a fire or explosion risk.

As described herein, air inlet 122 and air outlet 124 may have any suitable width, cross-sectional area, depth, shape, and/or configuration. The locations of air inlet 122 and air outlet 124 may be selected such that hydrogen leaks 140 from fuel cell 110 can be substantially purged by the flow of air 132. For example, air inlet 122 may be positioned at one end of enclosure 120 and air outlet 124 may be positioned at the opposite end of enclosure 120 so that the draft generated by air pressurizing mechanism 130 covers the full length of enclosure 120, thereby reducing the risk of low flow or dead spots in enclosure 120. Additionally, in some embodiments, air inlet 122 and air outlet 124 may be positioned at opposite ends and opposite sides of enclosure 120 to enable the draft generated to cross the full length and the full width of enclosure 120. In some embodiments, air inlet 122 may be located at a top section of enclosure 120. In other embodiments, air inlet 122 may be located at a bottom section of enclosure 120. While enclosure 120 has one air inlet and one air outlet as depicted in FIG. 1, it will be understood that a greater number of inlets or outlets may be provided.

Figure 2:
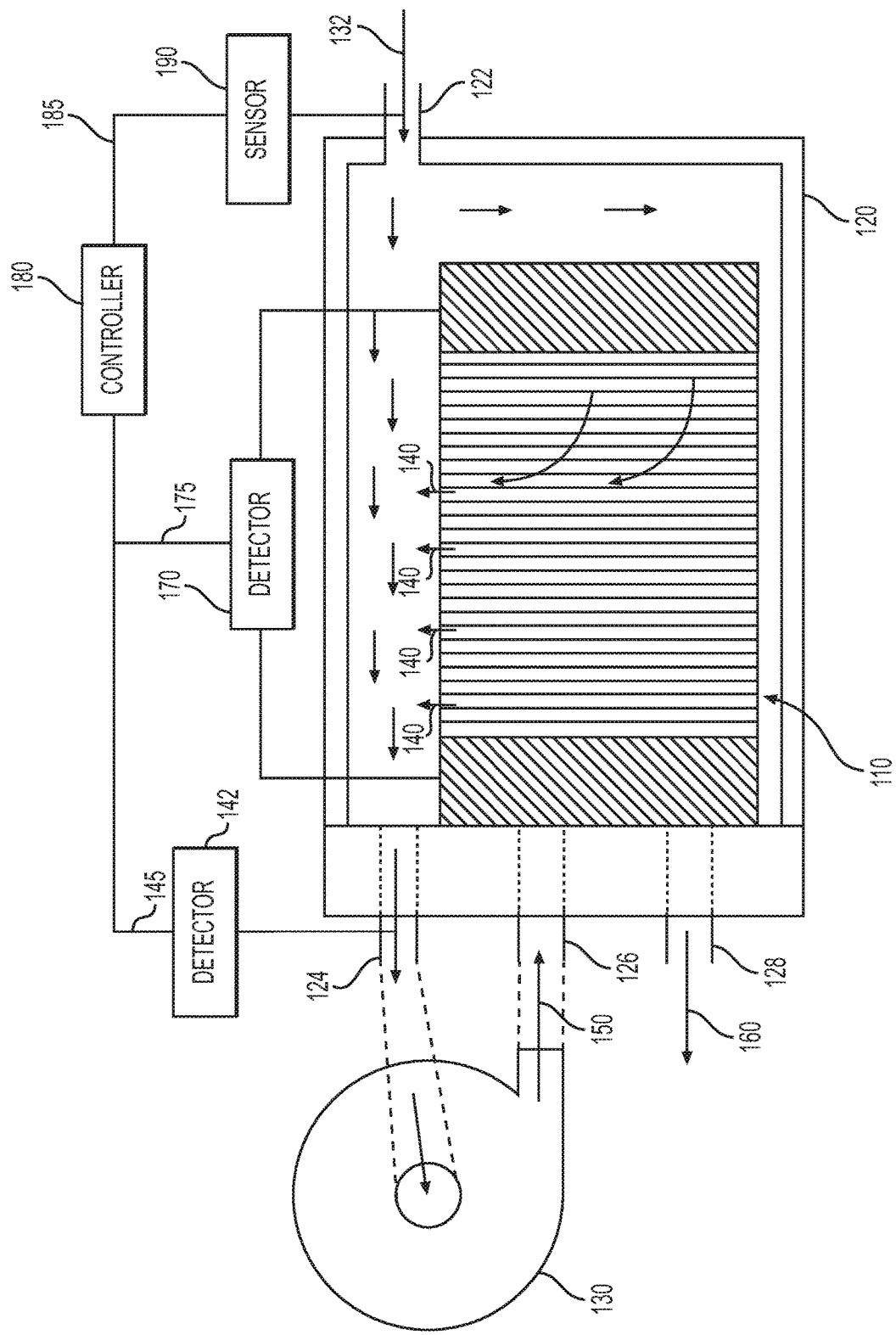
FIG. 2 is a schematic diagram of another exemplary fuel cell module, according to embodiments of the present disclosure.

In some embodiments, the percentage and/or the concentration of hydrogen in pressurized air stream 150 may be, for example, less than about 0.1%, about 0.2%, about 0.3%, about 0.4%, about 0.5%, about 0.6%, about 0.7%, about 0.8%, about 0.9%, about 1%, about 2%, about 3%, or about 4%. In some embodiments, as shown in FIG. 2, fuel cell module 100 may include a hydrogen detector 142 configured to be integral to or may be positioned along piping or conduit of air outlet 124 or pressurized air inlet 126 to detect the percentage and/or the concentration of hydrogen in pressurized air stream 150. Because any hydrogen leaks 140 in enclosure 120 may be drawn through air outlet 124 and directed through pressurized air inlet 126, a hydrogen leak may be detected regardless from where on the fuel cells 110 the leak is coming from. This may prevent having to use multiple hydrogen detectors surrounding a fuel cell stack or a leak being missed if not enough hydrogen detectors are used because the leak was not in proximity to the positioning of a hydrogen detector.

In some embodiments, at least a portion of pressurized air stream 150 supplied to cathode 112 via pressurized air inlet 126 may be consumed by the electrochemical reaction taking place at cathode 112, producing oxygen depleted air flow 160 discharged from exhaust outlet 128. The volume percentage and/or the concentration of oxygen in oxygen depleted air flow 160 may be less than that of pressurized air stream 150 supplied to cathode 112 due to the loss of oxygen consumed by the electrochemical reaction at cathode 112.

In some embodiments, hydrogen leaks 140 supplied to cathode 112 via pressurized air stream 150 via pressurized air inlet 126 may be consumed by the electrochemical reaction taking place at cathode 112 such that oxygen depleted air flow 160 is substantially free from hydrogen. For example, the percentage and/or the concentration of hydrogen in oxygen depleted air flow 160 may be less than about 0.1%, about 0.2%, about 0.3%, about 0.4%, about 0.5%, about 0.6%, about 0.7%, about 0.8%, about 0.9%, about 1%, or about 2%.

In some embodiments, fuel cell module 100 may include a plurality of fuel cells 110 arranged in a stack. For example, a fuel cell stack may include greater than 5, 10, 20, 25, 50, 100, 200, or more fuel cells 110 connected electrically in series or in parallel in a manner commonly known in the art. This description may reference fuel cell 110, but it is understood that the embodiments described are also applicable to a fuel cell module 100 having a fuel cell stack including a plurality of fuel cells 110.

In some embodiments, as shown in FIG. 2, fuel cell module 100 may include a voltage detector 170 and a controller 180. Voltage detector 170 may be electrically connected to fuel cell 110 and configured to detect a voltage of fuel cell 110 or a plurality of fuel cells 110 and generate a voltage signal 175 indicative of the value of the voltage. Voltage detector 170, for example, may include an analog voltmeter, a digital voltmeter, a multimeter, and/or an electronic test device. Voltage detector 170 may be configured to be in communication with controller 180 and configured to transmit voltage signal 175 to controller 180. Based on voltage signal 175 from voltage detector 170, controller 180 may be able to monitor the voltage of fuel cell 110.

In some embodiments, fuel cell module 110 may include a plurality of voltage detectors 170 that may generate a plurality of voltage signals 175 indicative of one or more voltage values of fuel cell 110 or of a plurality of fuel cells 110. For example, a fuel cell module 110 having a plurality of fuel cells 110 may have a corresponding plurality of voltage detectors 170 so that the voltage of each fuel cell 110 may be monitored. Based on the plurality of voltage signals 175 transmitted from voltage detectors 170, controller 180 may be configured to monitor one or more voltage values of each fuel cell 110.

In some embodiments, controller 180 may adjust the operation of fuel cell module 100 based on voltage signal 175. For example, when the voltage of fuel cell 110 detected is lower than a minimum set point, which may be indicative of excessive hydrogen leaks 140, controller 180 may decrease the current density of fuel cell 110 or stop the operation of fuel cell module 100. For example, controller 180 may be connected to a power regulator and/or a circuit configured to control the operation of fuel cell 110 (not shown in FIG. 2). The minimum set point, for example, may be per cell and range from about 0 to 1 volt, about 0.1 volt to 1 volt, about 0.2 volt to 1 volt, about 0.3 volt to 1 volt, 0.4 volt to 1 volt, 0.5 volt to 1 volt, 0.6 volt to 1 volt, 0.7 volt to 1 volt, 0.8 volt to 1 volt, or 0.9 volt to 1 volt.

In some embodiments, as shown in FIG. 2, fuel cell module 110 may include a sensor 190 configured to detect a mass or volumetric flow rate of air 132 through air inlet 122. In some embodiments, sensor 190 may be configured to be integral to air inlet 122 or may be positioned along piping or conduit of air inlet 122. Sensor 190 may be configured to generate an air signal 185 indicative of the mass or volumetric flow rate of air 132. Sensor 190 may be in communication with controller 180 and configured to transmit air signal 185 to controller 180. Controller 180 may be in communication with air pressurizing mechanism 130 and is configured to adjust the speed or power of air pressurizing mechanism 130 in order to regulate the flow rate of air 132. For example, based on air signal 185, controller 180 may send a command signal to air pressurizing mechanism 130 to adjust the speed of air pressurizing mechanism 130 so that it draws air 132 through air inlet 122 at a desired flow rate. In other embodiments, a flow control valve (not shown in FIG. 2) may be electrically or mechanically coupled to an actuator and/or a positioner at air inlet 122 and may be regulated by controller 180. Controller 180 may send a command signal to the actuator and/or the positioner of the flow control valve to open or close the valve to regulate flow of air 132 to a desired flow rate based on operation of fuel cell 110.

In some embodiments, by regulating the flow rate of air 132 through air inlet 122, controller 180 may regulate the purging of hydrogen leaks 140 in enclosure 120. For example, increasing the flow rate of air 132 through air inlet 122 may increase the flow rate of air 132 passing through enclosure 120, thereby increasing the amount of or the rate at which hydrogen leaks 140 may be drawn from enclosure 120 out of air outlet 124. This increase in flow rate may be done in response to a detection of hydrogen leak 140 in order to keep the concentration of hydrogen in air 132 at air outlet 124 or in pressurized air stream 150 at pressurized air outlet 126 below an acceptable threshold (e.g., ¼ of the lower flammability limit (LFL) or 1 vol %, or ½ LFL or 0.5 vol %). For example, as shown in FIG. 2, hydrogen detector 142 may be configured to generate a hydrogel signal 145 indicative of the mass or volumetric concentration or percentage of hydrogen in air 132 flowing through air outlet 124 or in pressurized air stream 150 entering pressurized air inlet 126. Hydrogen detector 142 may be in communication with controller 180 and configured to transmit hydrogen signal 145 to controller 180. Controller 180 may shut down fuel cell module 100 when a level of hydrogen detected exceeds a predetermined threshold.

In some embodiments, the flow rate of air 132 through air inlet 122 may be increased when hydrogen is detected by hydrogen detector 142 to keep the concentration of hydrogen in air 132 exiting air outlet 124 or of pressurized air stream 150 below an acceptable threshold. Additionally or alternatively, changing the flow rate of air 132 may be used to detect and quantify the leak of hydrogen 140. For example, when hydrogen is detected, a flow rate of air 132 through air inlet 122 may be increased or decreased and the resulting change of voltage of fuel cell 110 can be compared to an expected change in voltage for fuel cell 110 with no hydrogen leaks to quantify the hydrogen leak.

In some embodiments, controller 180 may determine an optimal flow rate for air 132 based on the design of fuel cell module 100, such as the size and/or geometry of enclosure 120, the number of fuel cells 110, and the locations of air inlet 122 and air outlet 124. For example, controller 180 may increase the flow rate of air 132 when fuel cell module 100 includes a plurality of fuel cells 110.

As described herein, controller 180 may be configured to utilize a variety of feedback control schemes, for example, Proportional-Integral-Derivative control, adaptive control, optimal control, model predictive control, nonlinear control, or intelligent control. Additionally, controller 180 may include one or more processors capable of controlling numerous functions of fuel cell module 100. Controller 180 may include a memory (e.g., a RAM), a secondary storage device (e.g., a ROM), a processor (e.g., a CPU), or any other components for executing instructions to perform the disclosed functions of fuel cell module 100. Various other circuits may be associated with controller 180, such as power supply circuitry, signal conditioning circuitry, data acquisition circuitry, signal output circuitry, signal filtering circuitry, signal amplification circuitry, and other types of circuitry known in the art.

In some embodiments, controller 180, voltage detector 170, sensor 190, hydrogen detector 142, and air pressurizing mechanism 130 may be operatively coupled, via, e.g., a wireless or hard connection, and may continuously, periodically, or stochastically communicate detection, measurement, and/or instruction signals. In some embodiments, controller 180 may indicate to a user of fuel cell module 110 that a voltage less than a minimum threshold is detected for example, by a visual or audible signal, and may shut down fuel cell module 100 automatically or upon receiving an instruction from the user.

Fuel cell module 100 described herein may be utilized in a variety of fuel cell systems and by methods for recovering hydrogen leaks in fuel cell systems and processing the leak hydrogen into water.

Method 200 for recovering hydrogen leaks in fuel cell systems may use one or more features of fuel cell module 100 described above in reference to FIGS. 1 and 2. Exemplary embodiments of method 200 are described below with reference to FIG. 3.

As described herein, some or all steps of method 200 may be performed by fuel cell module 110 or one or more components of fuel cell module 110, such as controller 180. The sequence of the steps of method 200 may change, and may be performed in various exemplary embodiments. Additional steps may be added to method 200. Some steps may be omitted or repeated, and/or may be performed simultaneously.

Figure 3:
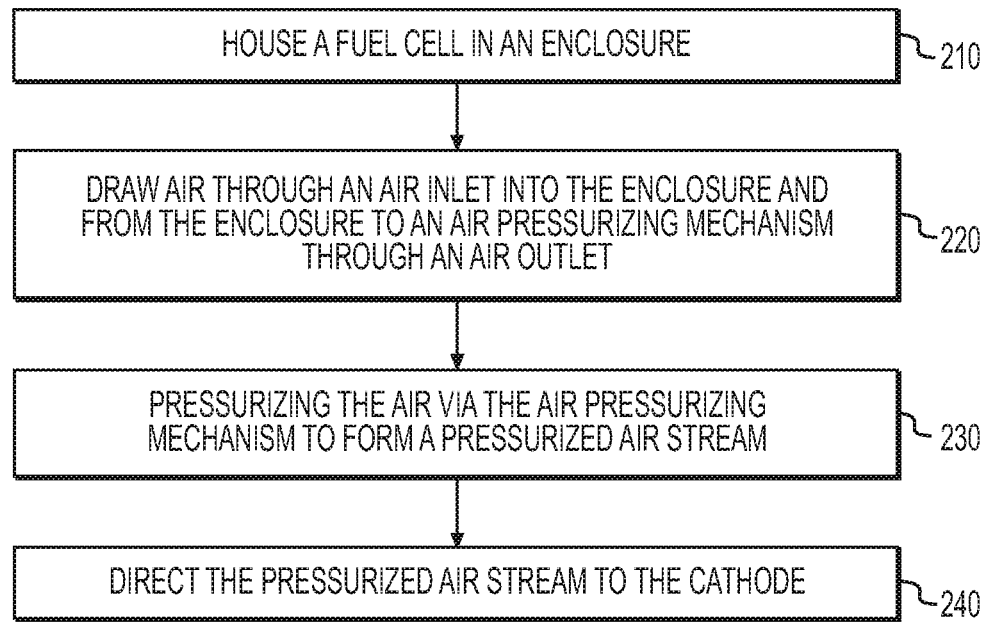
FIG. 3 is a flow chart of an exemplary method of reducing hydrogen leaks in a fuel cell system, according to embodiments of the present disclosure.

In some embodiments, method 200 may include steps 210-240 as shown in FIG. 3. Step 210 may include housing fuel cell 110 in enclosure 120. Step 210 may be omitted if fuel cell 110 is provided in enclosure 120 as part of fuel cell module 100. Step 220 may include drawing air 132, using air pressurizing mechanism 130, through air inlet 122 into enclosure 120 and from enclosure 120 into air pressurizing mechanism 130 through air outlet 124. Air 132 may be air from the surrounding environment or air from a compressed air supply or compressed oxygen supply. Step 220 may further include drawing or purging a substantial amount or all of hydrogen leaks 140 from fuel cell 110 into enclosure 120 and from enclosure 120 to air pressurizing mechanism 130 through air outlet 124.

Step 230 may include pressurizing air 132 via air pressurizing mechanism 130 to form a pressurized air stream 150. Step 230 may further include pressurizing hydrogen leaks 140 from fuel cell 110 together with air 132 via air pressurizing mechanism 130. Thus, pressurized air stream 150 may include both air 132 and any hydrogen leaks 140 from fuel cell 110.

Step 240 may include directing pressurizing air stream 150 to cathode 112. For example, an outlet of air pressurizing mechanism 130 may be fluidly connected to cathode 112 such that pressurized air stream 150 is supplied to cathode 112 for chemical reactions. Step 240 may further include processing the hydrogen in pressurized air stream 150 into water at cathode 112. Step 240 may also include discharging cathode exhaust from exhaust outlet 128. The cathode exhaust may include oxygen depleted air flow 160, water or water vapor, and/or an amount of hydrogen below a maximum set point or threshold.

Additional steps may be added to method 200. For example, method 200 may include detecting, using a voltage detector, a voltage of fuel cell 110. Method 200 may further include stopping the operation of fuel cell 110 or fuel cell module 100 when the voltage of drops below a predetermined threshold. Additionally or alternatively, method 200 may include measuring, using sensor 190, a flow rate of oxidant gas, such as air 132, through air inlet 122. Method 200 may further include adjusting the flow rate of air 132 by regulating the power or speed of air pressurizing mechanism 130. In some embodiments, method 200 may further include detecting the concentration of hydrogen in air 132 at air outlet 124 or the concentration of hydrogen in pressurized air stream 150 at pressurized air inlet 126. In some embodiments, method 200 may include adjusting the flow rate of air 132 to an optimal flow rate such that hydrogen leaks 140 from fuel cell 110 are substantially or completely purged with air 132 and processed into water at cathode 112.

The foregoing description has been presented for purposes of illustration. It is not exhaustive and is not limited to precise forms or embodiments disclosed. Modifications, adaptations, and other applications of the embodiments will be apparent from consideration of the specification and practice of the disclosed embodiments.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all cells and cell stacks falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments of the present disclosure will be apparent to those skilled in the art from consideration of the specification and practice of the present disclosure disclosed herein. It is intended that the specification and examples be considered as exemplary only, with a true scope and spirit of the present disclosure being indicated by the following claims.

What is claimed is:

1. A fuel cell module comprising:
   a fuel cell having an anode, a cathode, and an electrolyte positioned between the anode and the cathode, wherein a used fuel stream discharged from the anode is recirculated to the anode to recycle unconsumed fuel;
   an enclosure housing the fuel cell therein, the enclosure comprising an air inlet and an air outlet; and
   an air pressurizing mechanism fluidly connected to the enclosure, the air pressurizing mechanism is configured to draw air through the air inlet into the enclosure and from the enclosure to the air pressurizing mechanism through the air outlet, wherein the air pressurizing mechanism pressurizes the air to form a pressurized air stream that is directed to the cathode.

2. The fuel cell module of claim 1, wherein hydrogen leaked from the fuel cell is leaked into the enclosure where it is drawn by the air pressurizing mechanism from the enclosure and supplied to the cathode where it is processed into water.

3. The fuel cell module of claim 1, wherein the enclosure further comprises an exhaust outlet where oxygen depleted air is discharged from the cathode, and the enclosure is air-tight sealed except for the air inlet, and the air outlet, and the exhaust outlet.

4. The fuel cell module of claim 1, wherein the fuel cell is insulated from the enclosure.

5. The fuel cell module of claim 1, wherein the air inlet is located at a top section or at a bottom section of the enclosure and is located closer to the anode than the cathode.

6. The fuel cell module of claim 1, further comprising a voltage detector and a controller, wherein the voltage detector is configured to detect a voltage of the fuel cell and the controller is configured to stop the operation of the fuel cell when the voltage of the fuel cell drops below a predetermined threshold.

7. The fuel cell module of claim 1, further comprising a hydrogen detector positioned to detect hydrogen in the air through the air outlet or in the pressurized air stream.

8. The fuel cell module of claim 7, wherein the fuel cell module is shut down when a level of hydrogen detected exceeds a predetermined threshold.

9. The fuel cell module of claim 7, further comprising an air flow sensor configured to measure a flow rate of the air through the air inlet, wherein the flow rate of the air through the air inlet is increased when hydrogen is detected to keep the concentration of hydrogen in the pressurized air stream below an acceptable threshold.

10. The fuel cell module of claim 7, wherein a flow rate of air through air inlet is increased or decreased when hydrogen is detected and a resulting change of voltage of the fuel cell is compared to an expected change in voltage of the fuel cell with no hydrogen leaks in order to quantify a hydrogen leak.

11. A method of recovering hydrogen leaks in a fuel cell system, comprising:
 housing a fuel cell in an enclosure, the fuel cell having an anode, a cathode, and an electrolyte positioned between the anode and the cathode; and the enclosure comprising an air inlet and an air outlet;
 recirculating a used fuel stream discharged from the anode to the anode to recycle unconsumed fuel;
 drawing air through the air inlet into the enclosure and from the enclosure to an air pressurizing mechanism through the air outlet;
 pressurizing the air via the air pressurizing mechanism to form a pressurized air stream; and
 directing the pressurized air stream to the cathode.

12. The method of claim 11, further comprising drawing any hydrogen leaked from the fuel cell into the enclosure and directing it from the enclosure to the cathode through the air pressurizing mechanism, wherein the hydrogen leaked from the fuel cell is processed into water at the cathode.

13. The method of claim 11, further comprising discharging oxygen depleted air from the cathode through an exhaust outlet, wherein the enclosure is air-tight sealed except for the air inlet, the air outlet, and the exhaust outlet.

14. The method of claim 11, wherein the fuel cell is insulated from the enclosure.

15. The method of claim 11, wherein the air inlet is located at a top section or at a bottom section of the enclosure and is located closer to the anode than the cathode.

16. The method of claim 11, further comprising
 detecting, using a voltage detector, a voltage of the fuel cell; and
 stopping the operation of the fuel cell, using a controller, when the voltage of the fuel cell drops below a predetermined threshold.

17. The method of claim 11, further comprising detecting hydrogen in the air through the air outlet or in the pressurized air stream using a hydrogen detector.

18. The method of claim 17, further comprising shutting down the fuel cell module when a level of hydrogen detected by the hydrogen detector exceeds a predetermined threshold.

19. The method of claim 17, further comprising
 measuring, using an air flow sensor, a flow rate of the air through the air inlet; and
 increasing the flow rate of the air through the air inlet when hydrogen is detected by the hydrogen detector to keep the concentration of hydrogen in the pressurized air stream below an acceptable threshold.

20. The fuel cell module of claim 17, further comprising
 increasing or decreasing a flow rate of air through air inlet when hydrogen is detected; and
 comparing a resulting change of voltage of the fuel cell to an expected change in voltage of the fuel cell with no hydrogen leaks in order to quantify a hydrogen leak.

21. A fuel cell system comprising:
 a fuel cell stack, the fuel cell stack comprising a plurality of fuel cells having an anode, a cathode, and an electrolyte positioned between the anode and the cathode, wherein a used fuel stream discharged from the anode is recirculated to the anode to recycle unconsumed fuel;
 an enclosure housing the fuel cell stack therein, the enclosure comprising an air inlet and an air outlet; and
 an air pressurizing mechanism fluidly connected to the enclosure, the air pressurizing mechanism configured to draw air through the air inlet into the enclosure and from the enclosure to the air pressurizing mechanism through the air outlet, wherein the air pressurizing mechanism pressurizes the air to form a pressurized air stream that is directed to the cathodes of the plurality of fuel cells.

* * * * *